Jan. 2, 1923.

S. R. WRIGHT.
ELECTRICAL COIL.
FILED AUG. 22, 1921.

1,440,760.

Inventor
Stanley Robert Wright
By
B. Singer, Atty.

Patented Jan. 2, 1923.

1,440,760

UNITED STATES PATENT OFFICE.

STANLEY ROBERT WRIGHT, OF RAWDON, NEAR LEEDS, ENGLAND, ASSIGNOR TO IGRANIC ELECTRIC COMPANY LIMITED, OF LONDON, ENGLAND, A CORPORATION OF GREAT BRITAIN.

ELECTRICAL COIL.

Application filed August 22, 1921. Serial No. 494,411.

*To all whom it may concern:*

Be it known that I, STANLEY ROBERT WRIGHT, a subject of the King of Great Britain, and resident of Rawdon, near Leeds, Yorkshire, England, have invented certain new and useful Improvements in and Connected with Electrical Coils (for which I have obtained a patent in Great Britain dated June 18, 1919, No. 149,820), of which the following is a specification.

This invention relates to electrical wound coils having windings or layers of wire and insulating material and in particular to coils adapted for high voltage work where the initial surge voltage takes place over the first or last few turns, as obtains in the secondary windings of high tension transformers.

The object of the present invention is to provide a coil in which the value of the insulation increases as the initial surge potential difference per layer of the winding increases.

An electrical coil according to this invention is characterized in that the width of the windings or layers of wire varies throughout the thickness of the coil whilst the windings or layers of insulation are of constant width.

In applying the invention to the particular purpose of the coils constituting the secondary windings of high tension transformers the first layer of wire nearest the core of the coil, is of minimum width whilst the subsequent layers are gradually increased in width until the full or minimum width is obtained at or about the centre of the thickness of the coil winding when the width of the layers or windings of wire gradually diminish until a minimum is again obtained with the last layer applied. The layers or windings of insulating material remain of constant width.

In order that the invention may be clearly understood the same will now be described by aid of the accompanying drawings in which:—

Figure 1:
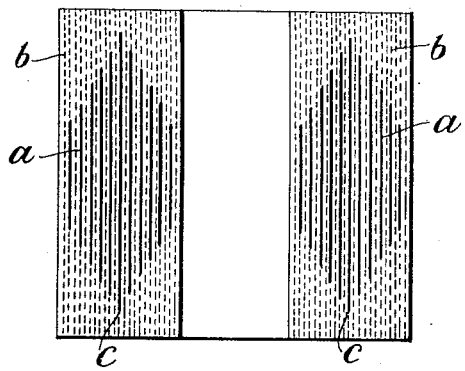
Fig. 1 is a longitudinal section through a coil wound in accordance with this invention.
Figure 2:
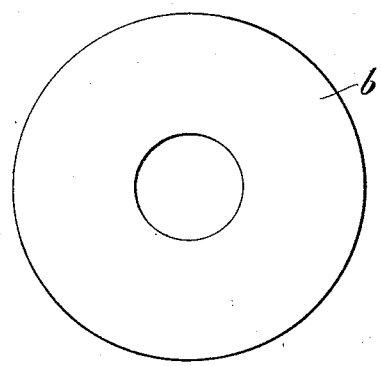
Fig. 2 is an end view of the completed coil.

In the drawings *a* represents the conductor windings and *b* the insulation of a coil constituting the secondary windings of a high tension transformer. This coil is built up in the usual manner upon a core, the first few layers consisting of insulation. When a sufficient thickness of insulation is wound upon the core a foreshortened layer of wire is applied and then a layer or layers of insulation. Each succeeding layer of wire increases in width until a point *c* approximating to the centre of the winding is reached, when the succeeding layers gradually diminish in width until the final layer is applied. The layers of insulation are of approximately constant width throughout the coil with the result that the greatest value of insulation obtains at the initial and final layers of the coil where exists in practice the greatest initial surge potential difference.

Such windings as above described may be obtained with any winding machine in which provision is made for gradually varying the length of the wire traverse.

What I claim and desire to secure by Letters Patent is:—

1. An electrical wound coil comprising windings of wire and insulating material in which the windings or layers of wire are of variable width and the windings or layers of insulation of constant width.

2. An electrical wound coil comprising windings of wire and insulating material in which the first winding or layer of wire nearest to the core of the coil is of minimum width whilst the subsequent windings or layers of wire are gradually increased in width until the full width is obtained at or about the centre of the coil winding when the width of the windings or layers of wire gradually diminish until a minimum is again obtained with the last winding or layer of wire applied, the width of each layer of insulation remaining constant throughout the coil for the purposes specified.

3. An electrical wound coil according to claim 1 in which the windings or layers of insulating material alternate with the windings or layers of wire and in which the width of each winding or layer of wire varies throughout the coil whilst the windings or layers of insulating material remain constant width throughout for the purposes specified.

In witness whereof I affix my signature.

STANLEY ROBERT WRIGHT.